(12) United States Patent
Pirkle

(10) Patent No.: US 6,185,859 B1
(45) Date of Patent: Feb. 13, 2001

(54) TUBING MADE FROM RESILIENT PLASTICS AND DEVICES MADE THEREFROM

(75) Inventor: Fred L. Pirkle, Abington, PA (US)

(73) Assignee: Texan Corporation, Warminster, PA (US)

( * ) Notice: Under 35 U.S.C. 154(b), the term of this patent shall be extended for 0 days.

(21) Appl. No.: 09/351,967

(22) Filed: Jul. 12, 1999

(51) Int. Cl.⁷ ...................................................... A01K 97/06
(52) U.S. Cl. ............................... 43/54.1; 43/4; 24/129 B; 138/178
(58) Field of Search ........................ 43/42.06, 42.24, 43/42.25, 42.33, 42.34, 42.36, 42.37, 44.49, 42.83, 4, 54.1; 24/908, 30.55, 18, 28, 29, 23 R, 23 W, 16 PB, 131 C, 129 B; 138/177, 178, DIG. 11, 121, 172, 173, 110, 128

(56) References Cited

U.S. PATENT DOCUMENTS

| | | | |
|---|---|---|---|
| 1,713,041 | * 5/1929 | Fey | 43/44.83 |
| 2,305,514 | * 12/1942 | Chandler | 43/44.89 |
| 2,520,654 | * 8/1950 | Rants | 43/44.89 |
| 2,636,304 | * 4/1953 | Swenson | 43/42.24 |
| 2,691,198 | * 10/1954 | Flood | 24/23 W |
| 2,700,244 | * 1/1955 | Greenwood | 43/57.1 |
| 2,990,641 | * 7/1961 | Weidman | 43/43.16 |
| 3,067,537 | * 12/1962 | Gregory et al. | 43/25.2 |
| 3,117,371 | * 1/1964 | Farley | 138/110 |
| 3,161,210 | * 12/1964 | Loof | 138/128 |
| 3,464,740 | * 9/1969 | Scruby et al. | 138/177 |
| 3,670,445 | * 6/1972 | Borger | 43/42.4 |
| 3,720,235 | * 3/1973 | Schrock | 138/177 |
| 3,981,402 | * 9/1976 | Miller | 206/534.2 |
| 4,214,397 | * 7/1980 | Kent | 43/42.28 |
| 4,530,179 | * 7/1985 | Larew | 43/42.06 |
| 4,922,646 | * 5/1990 | Basgal | 43/42.33 |
| 4,926,995 | * 5/1990 | Kauffman | 193/37 |
| 5,319,876 | * 6/1994 | Vlahek | 43/44.9 |
| 5,577,340 | * 11/1996 | Murphy | 43/43.2 |
| 5,582,212 | * 12/1996 | Tanzosh | 138/110 |
| 5,937,488 | * 8/1999 | Geiger | 24/16 PB |
| 6,112,770 | * 9/2000 | Walsh et al. | 138/110 |

FOREIGN PATENT DOCUMENTS

| | | | |
|---|---|---|---|
| 1493780 | * 7/1967 | (FR) | 43/42.24 |
| 118500 | * 4/1947 | (SE) | 43/42.24 |

* cited by examiner

*Primary Examiner*—Darren W. Ark
(74) *Attorney, Agent, or Firm*—Howson & Howson

(57) ABSTRACT

A poly (vinyl chloride) with longitudinal ribs formed on its inner wall by extrusion is slit helically to provide a strip that can be wound around a plurality of strands of fishing leader or other material, or used as a fish hook protector or as a spacer in a fishing lure. The ribs provide the tubing with an iridescent appearance for high visibility and also enhance the gripping ability of the tubing. Alternatively, and especially in the case of a thin walled tube, the ribs can be separated from one another manually to form the skirt of a fishing lure.

11 Claims, 4 Drawing Sheets

TUBING MADE FROM RESILIENT PLASTICS AND DEVICES MADE THEREFROM

SUMMARY OF THE INVENTION

This invention relates to flexible tubing made from plastics, and to devices made therefrom. Such devices include tying devices of the kind comprising a tube having a helical slit along at least part of its length, the slit permitting at least part of the length of tubing to be formed into a strip capable of being wound around an article to be tied. The devices also include fish hook protectors, spool keepers, fishing lures and components thereof made from flexible tubing.

Spiral-cut polypropylene tubing has been used for protecting and bundling electrical wires. In general, spiral-cut polypropylene tubing is supplied in short lengths of relatively stiff material, suitable for wrapping around heavy electrical wires, e.g. 10, 12 or 14 gauge single-conductor, insulated wires, but not suitable for tying bundles of fine gauge strands of wire or other fine gauge materials such as fishing leader. Polypropylene also tends to be at least moderately crystalline and is therefore ordinarily opaque or nearly so, making it unsuitable for applications in which a high translucence or transparency is desirable.

One object of this invention is to provide flexible tubing that has an iridescent effect when illuminated, making it more readily visible, and attractive in appearance. Other objects include ease of manufacture, improved strength, ease of cutting to a desired length, the ability to be manually separated into longitudinal strips, the achievement of a tying device capable of an improved grip on the object or objects being tied, and faster drying of the tying device when wet.

The tying device in accordance with the invention comprises a tube formed of a resilient plastics material, preferably poly (vinyl chloride). The tube has longitudinal ribs extending axially along its interior surface, each rib preferably comprising two substantially planar faces meeting each other at an angle of approximately 60 degrees. In a preferred embodiment, the exterior of the tube has a polygonal cross-section, there being one planar exterior face associated with each internal rib, such that the faces and ribs together form truncated 60° prisms for optimum light gathering and refraction.

For use as a tying, wrapping or protecting device, the tube has a helical slit along at least part of its length and extending at least a full turn around the axis of the tube. Preferably, the slit extends through a plurality of full turns from one end of the tube to the other. The slit permits at least part of the length of tubing to be formed into a strip capable of being wound around an article to be tied, wrapped or protected. The slitted tube can be used, for example, to secure a coil of fishing leader, as a fish hook protector, as a spacer in a fishing lure, or as a spool keeper for paying out leader from a spool.

The wall thickness of the tube between the ribs can be made sufficiently thin so that a portion of the tubing can be separated into longitudinal strips to produce a fishing lure.

A fish-attracting scent can be absorbed into the material of a tube with a helical slit, which can then be placed on a fish hook as an "artificial worm." Alternatively, the fish-attracting scent can be absorbed into the material of a fishing lure produced by separating a portion of a tube into longitudinal strips.

The preferred material for the tubing is poly (vinyl chloride), also known as "PVC." This material is softer than polyethylene or polypropylene and is more easily handled.

As will become apparent from the following detailed description, in the case of helically slitted tubing, the longitudinal ribs provide the tubing with an iridescent appearance for high visibility. The ribs also provide a better grip on the strands or articles about which the slitted tubing is wound. In the case in which the tubing is formed into a fishing lure, the ribs can be separated manually from one another to form the legs or skirt of the lure.

Other objects, details and advantages of the invention will be apparent from the following detailed description when read in conjunction with the drawings.

DETAILED DESCRIPTION

Figure 1:
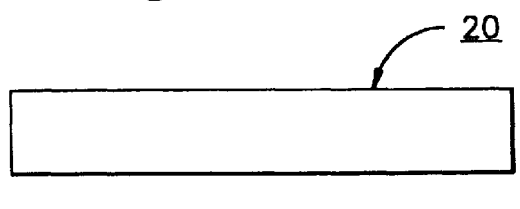
FIG. 1 is a side elevation of a typical resilient tube from which products in accordance with the invention are formed.
Figure 2:
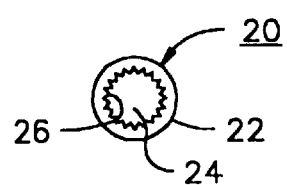
FIG. 2 is an end elevation of the tube of FIG. 1, showing the longitudinal ribs.

A length of tubing 20 in accordance with the invention is shown in FIGS. 1 and 2. The tubing is preferably made by extrusion of poly (vinyl chloride), also known as PVC. PVC is a preferred material because it can be made highly flexible resilient and translucent. Preferably the tubing composition incorporates a dye imparting to it a distinctive color. The color is not only attractive, but also useful in that it enables the tubing to be seen easily, and enables a length of tubing of one color to be distinguished from another length of tubing of a different color. Fluorescent dyes, i.e. dyes that emit visible wavelengths when excited by ultraviolet rays or other short wavelengths of radiation, may be used.

As shown in FIG. 2, the tubing has a circular, cylindrical outer wall 22, and a fluted, longitudinal inner passage 24 defined by an inner wall with longitudinal ribs 26. The longitudinal ribs are formed by a toothed die (not shown) in the extrusion process.

Figure 3:
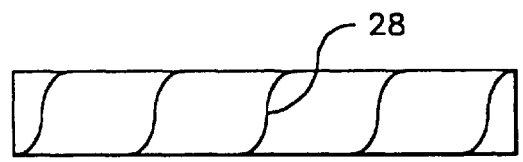
FIG. 3 is a side elevation of a resilient tube, showing a helical slit.

A first embodiment of the invention is illustrated in FIG. 3. A helical slit 28 is formed in the length of tubing 20. The slit 28 can be formed by feeding unslitted tubing from a supply reel through a rotary cutter (not shown) having a knife or a cutting wheel moving continuously in a circular path. Short lengths of helically slitted tubing, such as that shown in FIG. 3 can be cut off as the slitted tubing exits from the rotary cutter. The wall of the unslitted tubing intended for helical slitting is preferably about 2.0 mm thick so that it resists twisting as it passes through the rotary cutter.

Figure 4:
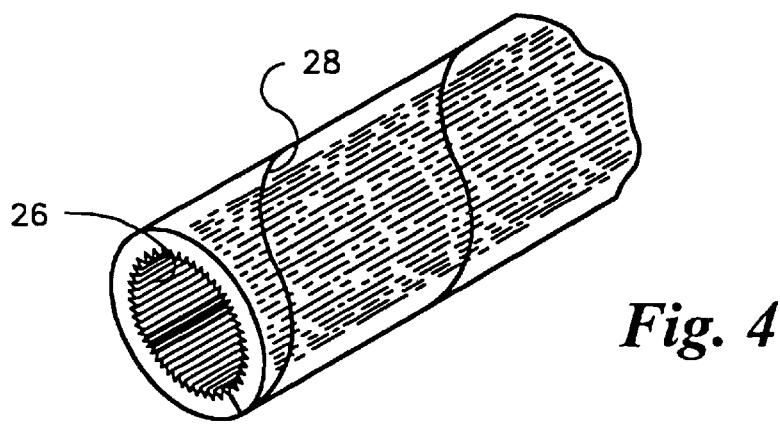
FIG. 4 is a fragmentary perspective view of a tube, illustrating the helical slit and the longitudinal ribs.

As shown in FIG. 4, the slitted tube of FIG. 3 has internal, longitudinally extending ribs 26, which are visible through the translucent wall of the tube. The ribs, as will be explained later herein in greater detail, disperse light, giving the tubing an iridescent effect.

Figure 5:
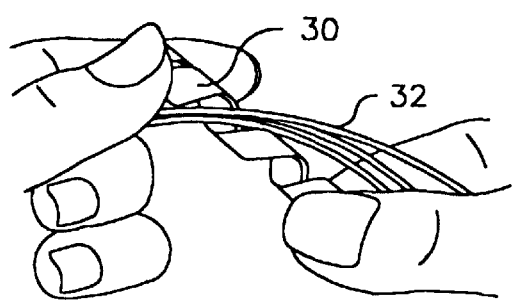
FIG. 5 is a perspective view illustrating the manner in which the resilient tube with a helical slit is used to tie a loop of fishing leader.
Figure 6:
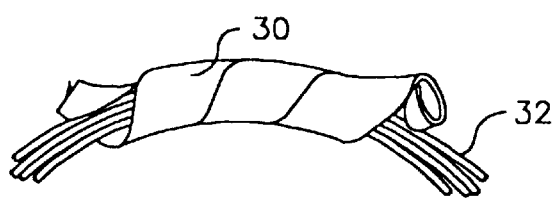
FIG. 6 is a perspective view illustrating the completion of the tying of the loop of fishing leader.

FIGS. 5 and 6 illustrate a typical use of a length of helically slitted tubing. As shown in FIG. 5, the length of tubing 30 is stretched lengthwise, thereby opening the helical slits so that the tubing forms a helical strip. The strip can be wrapped around a coil 32 of fishing leader, wire or similar material, as illustrated in FIG. 6, to keep the material free from tangling and separate from other coils of material.

Figure 7:
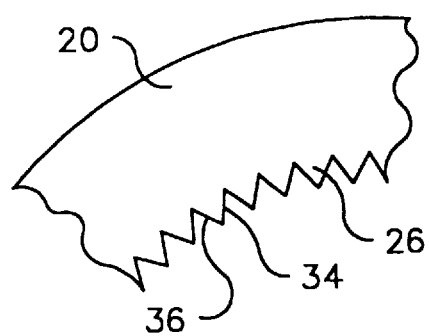
FIG. 7 is a fragmentary end elevation of a thick-walled embodiment of the resilient tube, illustrating the shape of the ribs.

As shown in FIG. 7, the ribs 26 of the tubing 20 have flat faces 34 and 36 disposed at an angle of 60°. Each such face is disposed at an angle of approximately 60° relative to a tangent to the closest point on the outer surface of the tubing, for optimum chromatic dispersion.

Figure 8:
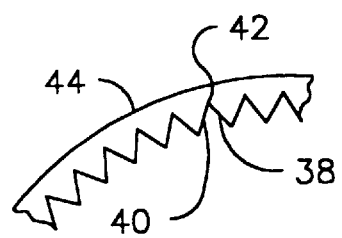
FIG. 8 is a fragmentary end elevation of a thin-walled embodiment of the resilient tube.

For use as a tie for fishing leader and the like, the tubing is preferably a thick-walled tubing as shown in FIG. 7, having a thickness typically about 2.0 mm. However, for some other applications, the tubing can be a thin-walled tubing as shown in FIG. 8, where the faces 38 and 40 of adjacent ribs meet at locations 42 which are separated from the outer surface 44 by a very short distance, e.g. 0.5 mm or less. Here again the faces of the ribs are preferably disposed at an angle of 60° relative to each other and relative to a tangent to the closest point on the outer surface of the tubing.

Figure 9:
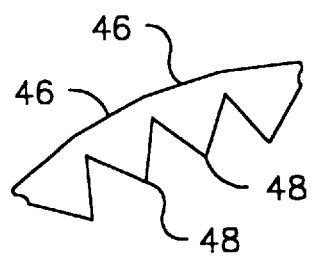
FIG. 9 is a fragmentary end elevation of a thin-walled, embodiment of the resilient tube.

As shown in FIG. 9, the tubing can be extruded with its outer surface formed of flat faces 46, the center of each such flat face being directly opposite a peak 48 of an adjacent rib. Here again the faces of each of the ribs are disposed at an angle of 60° to each other and at an angle of 60° relative to the adjacent flat face 46. Each rib then forms a truncated equiangular (60°) prism.

Figure 10:
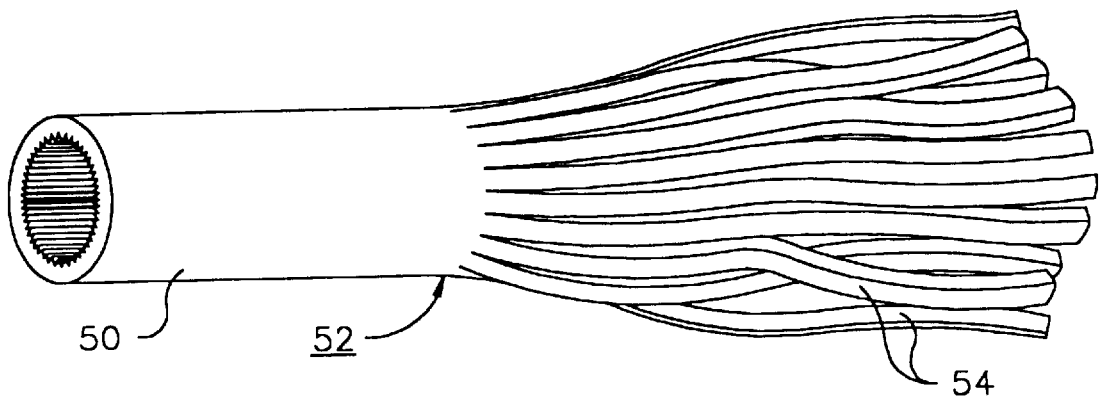
FIG. 10 is a perspective view showing the manner in which strips can be formed from the ribs of the tube of FIG. 8.

The thin-walled tubing can be separated into strips so that a length of tubing can be formed into a multi-legged, squid-like fishing lure. As shown in FIG. 10, a portion 50 at one end of a thin-walled tube 52 is left intact while the opposite end is separated into strips 54. Each such strip has a generally triangular cross-section, and disperses light, making it visible and attractive to fish.

Figure 11:
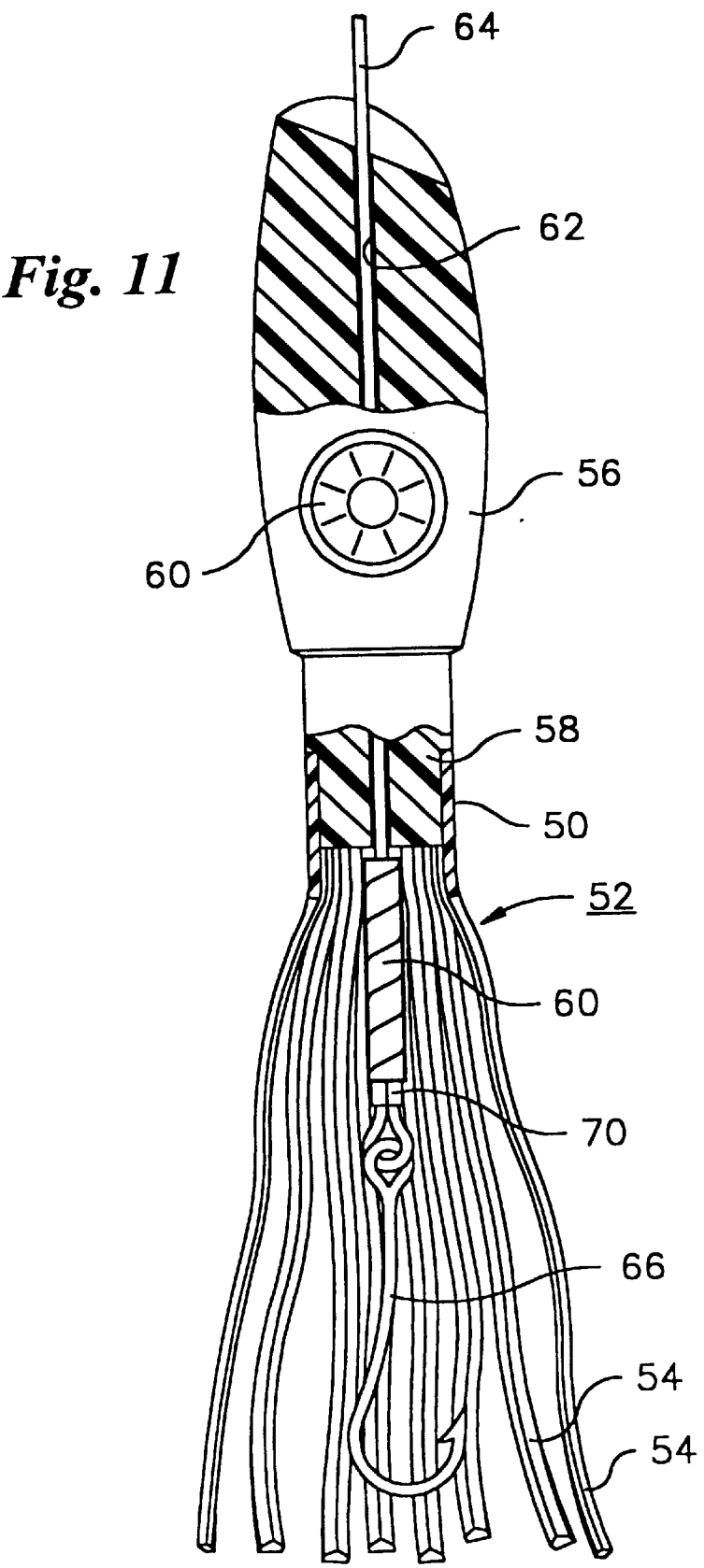
FIG. 11 is a perspective view showing a fishing lure made from the device of FIG. 10.

As shown in FIG. 11, the tube 52 is secured to a molded plastic lure head 56, the intact part 50 of the tube fitting tightly onto an extension 58 of the lure head, which is generally cylindrical in shape, although it may be provided with flutes or rings in order to resist rotation of the tube 52 or pulling of the tube 52 away from the lure head. Optionally, an adhesive can be used to ensure a tight connection between the tube and the lure head. The lure head has a pair of "eyes," one being shown at 60, and an internal passage 62, through which a leader 64 extends for connection to a hook 66, which is hidden among strips 54, which constitute the "legs" or "skirt" of the lure. A smaller sized length of helically slit tubing 68, corresponding to the helically slit tubing of FIG. 3, serves as a spacer, surrounding a portion of the leader 64 between the lure head and a crimp 70 by which a loop is formed for connection of the hook 66 to the leader.

The thin-walled slitted tubing enables a fisherman to assemble a "custom-built" lure easily and quickly, simply by selecting a length of tubing, separating the ribs at one end of the tubing to form separate legs, attaching the tubing to a molded lure head, and connecting a hook, leader and separator, as illustrated in FIG. 11.

Figure 12:
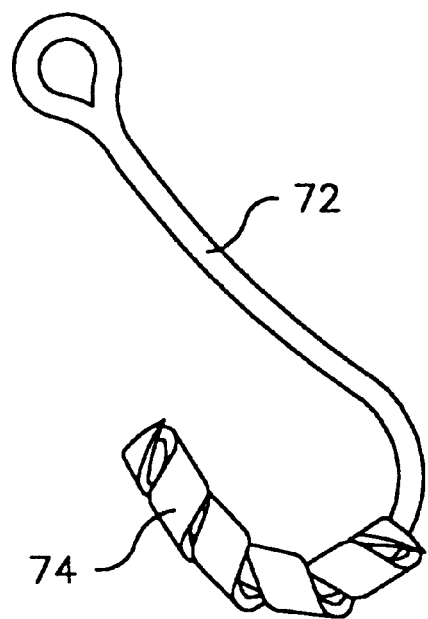
FIG. 12 is a perspective view showing the slitted tube used as a fish hook protector.

The helically slit tube has still another application as a hook protector, as shown in FIG. 12. When wrapped around the sharp end of a fishhook 72, the helically slit tube 74 covers the sharp tip and barb of the hook, thereby substantially reducing the likelihood of injury to the fisherman and others. The protective tube can be removed readily when the hook is ready to be used.

Figure 13:
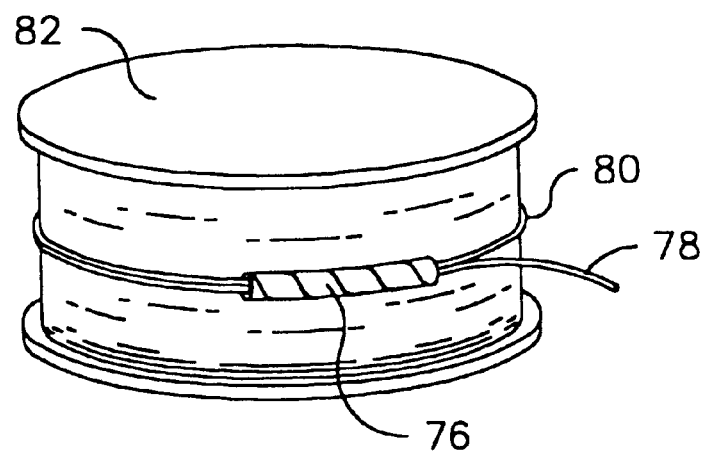
FIG. 13 is a perspective view showing the slitted tube used as a pay-out device for a reel of fishing leader.

Another application of the helically slitted tubing in the field of fishing is illustrated in FIG. 13, where a tube 76 is wrapped around the pay-out turn 78 and the next turn 80 of a leader on a spool 82. The tubing serves as a keeper, preventing undesired unwinding and tangling of the leader, but allowing leader to be paid out quickly and easily. Although an unslitted tube can be used as a keeper, it is difficult to install on a spool since the leader must be threaded through it twice. In contrast, the slitted tubing can be installed on two turns of the leader simply by stretching and wrapping in a manner similar to that illustrated in FIGS. 5 and 6.

The tubing of the invention has many other uses, both in the field of fishing and in other applications. For example, the helically slitted tubing can be threaded through the eye of a sinker and wound around a fishing line on opposite sides of the sinker eye, to provide a sliding weight for a so-called "fish-finder" rig. It can also be wound around the fishing rod and slid lengthwise along the rod (between guides) to secure hooks temporarily to the rod at various locations. The helically slitted tubing can also be used to secure bundles of electrical wires together. Longer lengths of helically slitted tubing can be used as lanyards for eyeglasses by wrapping the opposite ends around the earpieces.

Various modifications can be made to the invention described above. For example, in the case of a fishing lure, a ribs can be separated from one another at both ends of a length of tubing in order to provide a lure with a double skirt. A fish-attracting scent can be incorporated into the material of the tubing, for attracting fish whether the tubing is formed into a lure, or used in its helically slit form as artificial bait.

Still other modifications may be made to the apparatus and method described above without departing from the scope of the invention as defined in the following claims.

I claim:

1. A tube formed of a resilient, plastics material, the tube extending along an axis and having interior and exterior surfaces and longitudinal ribs extending axially along said interior surface, the tube being translucent so that the ribs are visible from the exterior of the tube, and also having a helical slit along at least part of its length, the helical slit extending at least a full turn around the axis of the tube, the slit permitting at least part of the tube to be formed into a strip capable of being wound around an article to be tied, in which each of the longitudinal ribs comprises two substantially planar faces meeting each other at an angle.

2. A tube according to claim 1, in which the helical slit extends at least twice around the axis of the tube.

3. A tube according to claim 1, having opposite ends, and in which the helical slit extends from one of said opposite ends to the other.

4. A tube according to claim 3, in which the helical slit extends circumferentially at least twice around the axis of the tube.

5. A tube according to claim 1, in which the resilient plastics material is polyvinyl chloride.

6. A tube formed of a resilient, plastics material, the tube extending along an axis and having interior and exterior surfaces and longitudinal ribs extending axially along said interior surface, the tube being translucent so that the ribs are visible from the exterior of the tube, and also having a helical slit along at least part of its length, the helical slit extending at least a full turn around the axis of the tube, the slit permitting at least part of the tube to be formed into a strip capable of being wound around an article to be tied, in which each of the longitudinal ribs comprises two substantially planar faces meeting each other at an angle of approximately 60 degrees.

7. A tube according to claim 6, in which the exterior surface of the tube has a polygonal cross-section and comprises a plurality of planar exterior faces, each face being directly opposed to one of the ribs and disposed at a 60° angle with respect to both faces of said one of the ribs so that the two faces of each rib together with the exterior face opposed thereto form a truncated 60° prism.

8. A tube according to claim 6, in which the resilient plastics material is polyvinyl chloride.

9. A tube according to claim 6, in which the helical slit extends at least twice around the axis of the tube.

10. A tube according to claim 6, having opposite ends, and in which the helical slit extends from one of said opposite ends to the other.

11. A tube according to claim 10 in which the helical slit extends circumferentially at least twice around the axis of the tube.

* * * * *